United States Patent
Yasutome

(10) Patent No.: US 10,902,131 B2
(45) Date of Patent: Jan. 26, 2021

(54) INFORMATION PROCESSING DEVICE, INFORMATION PROCESSING METHOD, AND NON-TRANSITORY COMPUTER READABLE MEDIUM FOR PROVIDING IMPROVED SECURITY

(71) Applicant: NEC CORPORATION, Tokyo (JP)

(72) Inventor: Yoshio Yasutome, Tokyo (JP)

(73) Assignee: NEC CORPORATION, Tokyo (JP)

( * ) Notice: Subject to any disclaimer, the term of this patent is extended or adjusted under 35 U.S.C. 154(b) by 203 days.

(21) Appl. No.: 16/082,625

(22) PCT Filed: Feb. 22, 2017

(86) PCT No.: PCT/JP2017/006570
§ 371 (c)(1),
(2) Date: Sep. 6, 2018

(87) PCT Pub. No.: WO2017/169323
PCT Pub. Date: Oct. 5, 2017

(65) Prior Publication Data
US 2019/0102562 A1    Apr. 4, 2019

(30) Foreign Application Priority Data

Mar. 30, 2016  (JP) ................................ 2016-067734

(51) Int. Cl.
*G06F 21/57* (2013.01)
*G06F 16/35* (2019.01)
*H04L 29/06* (2006.01)

(52) U.S. Cl.
CPC .......... *G06F 21/577* (2013.01); *G06F 16/353* (2019.01); *G06F 21/57* (2013.01);
(Continued)

(58) Field of Classification Search
CPC ...... G06F 21/577; G06F 16/353; G06F 21/57; H04L 63/1433; H04L 63/1441; H04L 29/06; H04L 63/20
See application file for complete search history.

(56) References Cited

U.S. PATENT DOCUMENTS

| | | | |
|---|---|---|---|
| 2012/0151588 A1* | 6/2012 | Wang | H04W 12/12 726/24 |
| 2012/0210434 A1* | 8/2012 | Curtis | H04L 63/1441 726/25 |
| 2016/0300227 A1* | 10/2016 | Subhedar | H04L 63/1408 |

FOREIGN PATENT DOCUMENTS

| | | |
|---|---|---|
| JP | 4469910 B1 | 6/2010 |
| JP | 2011-66834 A | 3/2011 |

(Continued)

OTHER PUBLICATIONS

Mana Kanda "A study of threat Analysis in Electronic Commerce", Proceedings of the National Convention of Information Processing Society of Japan Dai 55 Kai (Heisei 9 Nen Koki), Sep. 24, 1997, 5M-6, pp. 4-455 to 4-456.

(Continued)

*Primary Examiner* — Ashokkumar B Patel
*Assistant Examiner* — Quazi Farooqui
(74) *Attorney, Agent, or Firm* — Sughrue Mion, PLLC

(57) ABSTRACT

An information processing device includes a selection receiving unit that receives an input indicating selection of at least one countermeasure among a plurality of countermeasures applicable to a terminal, an operating information specifying unit that specifies a type of operating information corresponding to the countermeasure applicable to the terminal, an operating information acquisition unit that acquires operating information of the type specified by the operating information specifying unit, a remaining terminal specifying unit that specifies remaining terminals where a (Continued)

security risk remains when the countermeasure received by the selection receiving unit is applied based on terminal-specific countermeasure information indicating a countermeasure applicable to each terminal against the security risk, a prediction unit that predicts the number of remaining terminals at a future time based on the operating information acquired by the operating information acquisition unit, and a presentation unit that presents prediction results predicted by the prediction unit.

12 Claims, 15 Drawing Sheets

(52) U.S. Cl.
CPC ...... *H04L 63/1433* (2013.01); *H04L 63/1441* (2013.01); *H04L 63/20* (2013.01)

(56) References Cited

FOREIGN PATENT DOCUMENTS

| JP | 2012-208863 | A | 10/2012 | |
|----|----|----|----|----|
| JP | 5304243 | B2 | 10/2013 | |
| JP | 2015-138509 | A | 7/2015 | |
| WO | WO-2009085239 | A2 * | 7/2009 | ......... H04L 63/1441 |
| WO | 2015/114791 | A1 | 8/2015 | |

OTHER PUBLICATIONS

International Search Report of PCT/JP2017/006570 filed May 16, 2017.

Communication dated Sep. 3, 2019 from Japanese Patent Office in counterpart JP Application No. 2016-067734.

* cited by examiner

VULNERABILITY DISPLAY SCREEN

OVERVIEW OF VULNERABILITY A

| AT RISK | ▼REMAINING RISK PREDICTED VALUE AFTER ONE WEEK | REMAINING RISKS AFTER COUNTERMEASURE | COUNTERMEASURE (1) | COUNTERMEASURE (2) | COUNTERMEASURE (3) |
|---|---|---|---|---|---|
| 90 | 90 | 90 | ☐ (28) | ☐ (69) | ☐ (15) |

| | |
|---|---|
| COUNTERMEASUR (1) | DESCRIPTION OF COUNTERMEASURE (1) |
| COUNTERMEASUR (2) | DESCRIPTION OF COUNTERMEASURE (2) |
| COUNTERMEASUR (3) | DESCRIPTION OF COUNTERMEASURE (3) |

Fig. 2

| TERMINAL IDENTIFICATION INFORMATION | APPLICABLE COUNTERMEASURE |
|---|---|
| TERMINAL A | COUNTERMEASURE (1), COUNTERMEASURE (3) |
| TERMINAL B | COUNTERMEASURE (2) |
| TERMINAL C | COUNTERMEASURE (3) |
| : | : |

Fig. 3

| SECURITY RISK | COUNTERMEASURE | TYPE OF OPERATING INFORMATION |
|---|---|---|
| VULNERABILITY A | <COUNTERMEASURE (1)> APPLY PATCH AAAA AND RESTART | PATCH APPLICATION HISTORY |
| | | RESTART HISTORY |
| | | CONTINUOUS OPERATING TIME |
| | <COUNTERMEASURE (2)> STOP PROCESS ZZZZ | OPERATING HISTORY OF PROCESS ZZZZ |
| | <COUNTERMEASURE (3)> BLOCK PORT 1027 | USAGE HISTORY OF PORT 1027 |
| : | : | : |

Fig. 4

| TERMINAL TO BE MANAGED | APPLICABLE COUNTERMEASURE | OPERATING INFORMATION | |
|---|---|---|---|
| TERMINAL A | COUNTERMEASURE (1) | PATCH APPLICATION HISTORY | 2015/5/7 (THU) 9:51 APPLY PATCH BBBB<br>2015/5/21 (THU) 9:46 APPLY PATCH CCCC |
| | | RESTART HISTORY | 2015/5/7 (THU) 10:00<br>2015/5/14 (THU) 10:00<br>2015/5/21 (THU) 10:00 |
| | | CONTINUOUS OPERATING TIME | 9060 MINUTES |
| | COUNTERMEASURE (3) | USAGE HISTORY OF PORT 1027 | 2015/5/25 (MON) 13:25 192.168.1.27<br>2015/5/26 (TUE) 9:21 192.168.1.185 |
| TERMINAL B | COUNTERMEASURE (2) | OPERATING HISTORY OF PROCESS ZZZZ | 2015/5/26 (TUE) 14:36 START<br>2015/5/26 (TUE) 14:39 STOP |
| : | : | : | : |

Fig. 5

| AFTER IMMEDIATE EXECUTION | NEXT DAY | AFTER ONE WEEK | AFTER ONE MONTH | AFTER THREE MONTHS |
|---|---|---|---|---|
| 22 | 13 | 6 | 2 | 0 |

Fig. 6

VULNERABILITY DISPLAY SCREEN

OVERVIEW OF VULNERABILITY A

| AT RISK | ▼REMAINING RISK PREDICTED VALUE AFTER ONE WEEK | REMAINING RISKS AFTER COUNTERMEASURE | COUNTERMEASURE (1) | COUNTERMEASURE (2) | COUNTERMEASURE (3) |
|---|---|---|---|---|---|
| 90 | 6 | 0 | ■ | ■ | ■ |

| | |
|---|---|
| COUNTERMEASURE (1) | DESCRIPTION OF COUNTERMEASURE (1) |
| COUNTERMEASURE (2) | DESCRIPTION OF COUNTERMEASURE (2) |
| COUNTERMEASURE (3) | DESCRIPTION OF COUNTERMEASURE (3) |

Fig. 7

| TERMINAL IDENTIFICATION INFORMATION | INFORMATION TYPE | TERMINAL DATA |
|---|---|---|
| TERMINAL A | OS TYPE | × × × |
|  | OS VERSION | 6.1 |
|  | INSTALLED APPLICATION | SOFTWARE A, SOFTWARE B··· |
| TERMINAL B | : | : |
| : | : | : |

Fig. 12

| TERMINAL IDENTIFICATION INFORMATION | CLASSIFICATION 1 | CLASSIFICATION 2 |
|---|---|---|
| TERMINAL A | SERVER | — |
| TERMINAL B | SERVER | — |
| TERMINAL C | SERVER | — |
| : | : | : |
| TERMINAL a | CLIENT | PRIORITY HIGH |
| TERMINAL b | CLIENT | PRIORITY INTERMEDIATE |
| TERMINAL c | CLIENT | PRIORITY LOW |
| : | : | : |

Fig. 13

VULNERABILITY DISPLAY SCREEN

OVERVIEW OF VULNERABILITY A

| | AT RISK | ▼REMAINING RISK PREDICTED VALUE AFTER ONE WEEK | REMAINING RISKS AFTER COUNTERMEASURE | COUNTERMEASURE (1) | COUNTERMEASURE (2) | COUNTERMEASURE (3) |
|---|---|---|---|---|---|---|
| TOTAL | 90 | 90 | 90 | | | |
| SERVER | 10 | 10 | 10 | ☐ (5) | ☐ (4) | ☐ (3) |
| CLIENT | 80 | 80 | 80 | | | |
| PRIORITY: HIGH | 10 | 10 | 10 | ☐ (8) | ☐ (5) | ☐ (2) |
| PRIORITY: INTERMEDIATE | 15 | 15 | 15 | ☐ (5) | ☐ (10) | ☐ (5) |
| PRIORITY: LOW | 55 | 55 | 55 | ☐ (10) | ☐ (50) | ☐ (5) |

| COUNTERMEASURE (1) | DESCRIPTION OF COUNTERMEASURE (1) |
|---|---|
| COUNTERMEASURE (2) | DESCRIPTION OF COUNTERMEASURE (2) |
| COUNTERMEASURE (3) | DESCRIPTION OF COUNTERMEASURE (3) |

Fig. 14

|  | AFTER IMMEDIATE EXECUTION | NEXT DAY | AFTER ONE WEEK | AFTER ONE MONTH | AFTER THREE MONTHS |
|---|---|---|---|---|---|
| TOTAL | 22 | 13 | 6 | 2 | 0 |
| SERVER | 8 | 8 | 5 | 2 | 0 |
| CLIENT | 14 | 5 | 1 | 0 | 0 |
| PRIORITY: HIGH | 3 | 1 | 0 | 0 | 0 |
| PRIORITY: INTERMEDIATE | 4 | 1 | 0 | 0 | 0 |
| PRIORITY: LOW | 7 | 3 | 1 | 0 | 0 |

Fig. 15

VULNERABILITY DISPLAY SCREEN

OVERVIEW OF VULNERABILITY A

| | AT RISK | ▼REMAINING RISK PREDICTED VALUE AFTER ONE WEEK | REMAINING RISKS AFTER COUNTERMEASURE | COUNTERMEASURE (1) | COUNTERMEASURE (2) | COUNTERMEASURE (3) |
|---|---|---|---|---|---|---|
| TOTAL | 90 | 6 | 0 | | | |
| SERVER | 10 | 5 | 0 | ■ (5) | ■ (4) | ■ (1) |
| CLIENT | 80 | 1 | 0 | | | |
| PRIORITY: HIGH | 10 | 0 | 0 | ■ (8) | ■ (2) | □ (0) |
| PRIORITY: INTERMEDIATE | 15 | 0 | 0 | ■ (5) | ■ (10) | □ (5) |
| PRIORITY: LOW | 55 | 1 | 0 | ■ (10) | ■ (45) | □ (5) |

| COUNTERMEASURE (1) | DESCRIPTION OF COUNTERMEASURE (1) |
| COUNTERMEASURE (2) | DESCRIPTION OF COUNTERMEASURE (2) |
| COUNTERMEASURE (3) | DESCRIPTION OF COUNTERMEASURE (3) |

Fig. 16

INFORMATION PROCESSING DEVICE, INFORMATION PROCESSING METHOD, AND NON-TRANSITORY COMPUTER READABLE MEDIUM FOR PROVIDING IMPROVED SECURITY

This application is a National Stage of International Application No. PCT/JP2017/006570 filed Feb. 22, 2017, claiming priority based on Japanese Patent Application No. 2016-067734 filed Mar. 30, 2016, the disclosure of which is incorporated herein in its entirety by reference.

TECHNICAL FIELD

The present invention relates to an information processing device, an information processing method, and a non-transitory computer readable medium.

BACKGROUND ART

Terminals on a network are subject to security risks such as vulnerabilities in hardware or software and threats caused by external attacks. In general, there are several countermeasures that can be taken against a security risk.

However, countermeasures other than applying patches against vulnerabilities cannot be applied to all terminals because transmission limitations, configuration changes and the like differ from terminal to terminal. Thus, in the case of taking countermeasures on a large number of terminals, high costs have been needed to develop the countermeasures.

In view of the foregoing, inventions that support the development of countermeasures against (how to deal with) security risks in each terminal have been proposed recently. For example, Patent Literature 1 discloses an invention that analyzes a security risk based on the state of a system in operation and presents the most appropriate countermeasure among possible countermeasures for reducing the security risk in consideration of various constraints imposed on the system in operation.

CITATION LIST

Patent Literature

PTL1: Japanese Patent No. 5304243

SUMMARY OF INVENTION

Technical Problem

As described above, the invention disclosed in Patent Literature 1 presents the most appropriate countermeasure when there is a security risk in a terminal. However, because effects on the terminal and the system caused by applying the proposed countermeasure are unknown, a security administrator has not been able to determine whether to apply the proposed countermeasure immediately and, when a plurality of countermeasures are proposed, which of them is the most appropriate. Therefore, it has been difficult for a security administrator to develop countermeasures against security risks.

An exemplary object of the present invention is to provide a technique to solve the above problem.

Solution to Problem

According to one exemplary aspect of the present invention, an information processing device includes a selection receiving unit configured to receive an input indicating selection of at least one countermeasure among a plurality of countermeasures applicable to a terminal with a security risk, an operating information specifying unit configured to specify a type of operating information corresponding to a countermeasure applicable to the terminal by using terminal-specific countermeasure information indicating a countermeasure applicable to each terminal against the security risk and definition information defining correspondence between a type of operating information of the terminal and a countermeasure against the security risk, an operating information acquisition unit configured to acquire operating information of the type specified by the operating information specifying unit among the operating information of the terminal, a remaining terminal specifying unit configured to specify remaining terminals where the security risk remains when the countermeasure received by the selection receiving unit is applied based on the terminal-specific countermeasure information, a prediction unit configured to predict the number of the remaining terminals at a future time based on the operating information acquired by the operating information acquisition unit, and a presentation unit configured to present prediction results predicted by the prediction unit.

According to one exemplary aspect of the present invention, an information processing method is an information processing method performed by an information processing device, the method including a step of receiving an input indicating selection of at least one countermeasure among a plurality of countermeasures applicable to a terminal with a security risk, a step of specifying a type of operating information corresponding to a countermeasure applicable to the terminal by using terminal-specific countermeasure information indicating a countermeasure applicable to each terminal against the security risk and definition information defining correspondence between a type of operating information of the terminal and a countermeasure against the security risk, a step of acquiring operating information of the specified type among the operating information of the terminal, a step of specifying remaining terminals where the security risk remains when the received countermeasure is applied based on the terminal-specific countermeasure information, a step of predicting the number of the remaining terminals at a future time based on the acquired operating information, and a step of presenting the predicted results.

According to one exemplary aspect of the present invention, a non-transitory computer readable medium stores a program causing a computer to execute a step of receiving an input indicating selection of at least one countermeasure among a plurality of countermeasures applicable to a terminal with a security risk, a step of specifying a type of operating information corresponding to a countermeasure applicable to the terminal by using terminal-specific countermeasure information indicating a countermeasure applicable to each terminal against the security risk and definition information defining correspondence between a type of operating information of the terminal and a countermeasure against the security risk, a step of acquiring operating information of the specified type among the operating information of the terminal, a step of specifying remaining terminals where the security risk remains when the received countermeasure is applied based on the terminal-specific countermeasure information, a step of predicting the number of the remaining terminals at a future time based on the acquired operating information, and a step of presenting the predicted results.

Advantageous Effects of Invention

According to the exemplary aspects of the present invention, a security administrator can easily develop countermeasures against security risks.

BRIEF DESCRIPTION OF DRAWINGS

FIG. 2 is a view showing an example of a screen generated by the information processing device according to the first embodiment.

FIG. 3 is a view showing an example of terminal-specific countermeasure information according to the first and second embodiments.

FIG. 4 is a view showing an example of definition information according to the first and second embodiments.

FIG. 5 is a view showing an example of operating information according to the first and second embodiments.

FIG. 6 is a view showing an example of prediction results predicated by a predication unit according to the first embodiment.

FIG. 7 is a view showing an example of a screen presented by a presentation unit according to the first embodiment.

FIG. 12 is a view showing an example of terminal information acquired by an information acquisition unit according to the second embodiment.

FIG. 13 is a view showing an example of classification information stored by a classification information storage unit according to the second embodiment.

FIG. 14 is a view showing an example of a screen generated by a display processing unit according to the second embodiment.

FIG. 15 is a view showing an example of prediction results predicated by a predication unit according to the second embodiment.

FIG. 16 is a view showing an example of a screen presented by a presentation unit according to the second embodiment.

DESCRIPTION OF EMBODIMENTS

Exemplary embodiments of the present invention will be described hereinafter with reference to the drawings. Note that, in the figures, the identical reference symbols denote identical structural elements and the redundant explanation thereof is omitted as appropriate.

First Embodiment

[Processing Configuration]

Figure 1:
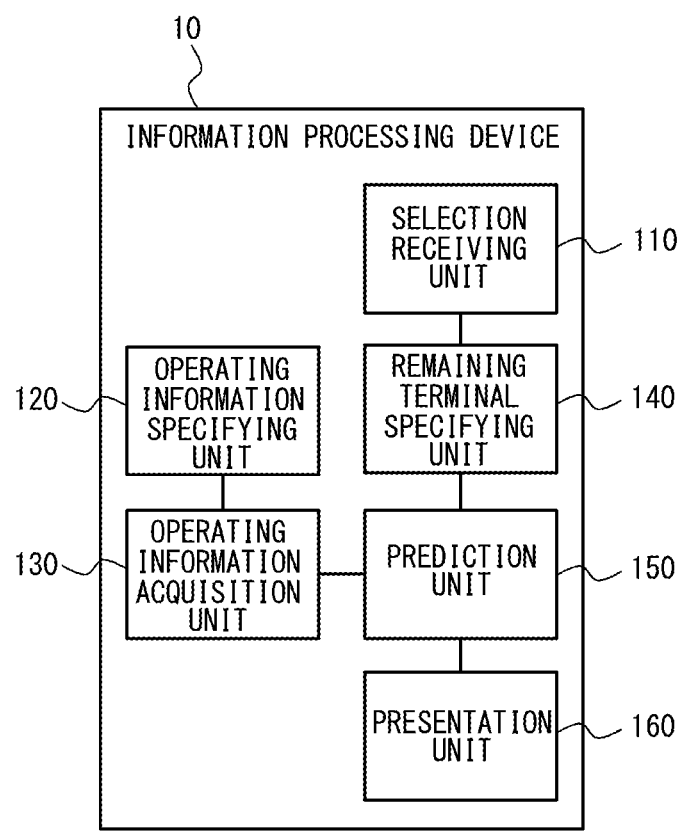
FIG. 1 is a view conceptually showing the processing configuration of an information processing device according to a first embodiment.

FIG. 1 is a view conceptually showing the processing configuration of an information processing device 10 according to a first embodiment. As shown in FIG. 1, the information processing device 10 according to the first embodiment includes a selection receiving unit 110, an operating information specifying unit 120, an operating information acquisition unit 130, a remaining terminal specifying unit 140, a prediction unit 150, and a presentation unit 160.

The selection receiving unit 110 receives an input indicating that at least one countermeasure is selected from a plurality of countermeasures that are applicable to a terminal to be managed having security risks. Security risks include vulnerabilities in a terminal to be managed or threats caused by external attacks to a terminal to be managed. A terminal to be managed is a terminal connected to the information processing device 10 through a network, whose security state is monitored. A terminal to be managed is not only communication equipment such as a client terminal, a server, a switch or a router on a network but also everything with a function of connecting to a network or a means of communicating through a network (so-called IoT (Internet of Things). A countermeasure is an action to be taken to resolve, prevent or reduce vulnerabilities and threats, and an applicable countermeasure is an action that can be taken on a terminal to be managed among actions against vulnerabilities and threats. The selection receiving unit 110 receives an input for selecting a countermeasure against a security risk (vulnerability A in this example) through a screen shown in FIG. 2, for example.

FIG. 2 is a view showing an example of a screen that is generated by the information processing device 10 and displayed on a display device (not shown) connected to the information processing device 10. Note that FIG. 2 is an example of a screen in the case where the security risk is a vulnerability A. The screen of FIG. 2 displays the number of terminals to be managed having the vulnerability A ("at risk"), the number of remaining risks after countermeasure (the number of terminals to be managed in which the vulnerability A remains) if each countermeasure is taken ("remaining risks after countermeasure"), a predicted value of remaining risks at a future time (after one week in this example) ("remaining risk predicted value"), and each of countermeasures against the vulnerability A ("countermeasure (1)", "countermeasure (2)" and "countermeasure (3)") in association with one another. A figure in parentheses in a field in a row of each countermeasure indicates the number of terminals to be managed to which a countermeasure corresponding to this row is applicable. The screen of FIG. 2 also displays the overview of the vulnerability A and a description of each countermeasure against the vulnerability A. The screen example of FIG. 2 shows that, among 90 terminals to be managed having the vulnerability A, "countermeasure (1)" can be applied to 28 terminals, "countermeasure (2)" can be applied to 69 terminals, and "countermeasure (3)" can be applied to 15 terminals. Note that the sum of the terminals to be managed corresponding to the respective countermeasures is different from the number of terminals (90) as a parameter because there are terminals to be managed to which a plurality of countermeasures are applicable. Further, in the screen of FIG. 2, by clicking on the black downward triangle at "remaining risk predicted value", a drop-down list of choices for a future time (e.g., immediately, next day, after one week, after one month etc.) is displayed. When a certain future time is selected from the drop-down list, a predicted value at the selected future time (after one week in this example) is displayed in the remaining risk predicted value.

The screen of FIG. 2 is generated by the information processing device 10 based on information indicating countermeasures against the vulnerability A which are applicable to each terminal to be managed (terminal-specific countermeasure information) as shown in FIG. 3, for example. FIG. 3 is a view showing an example of the terminal-specific countermeasure information. Note that FIG. 3 shows an example of the terminal-specific countermeasure information in the case where the security risk is the vulnerability A. The terminal-specific countermeasure information contains terminal identification information (e.g., MAC (Media Access Control) address etc.) that identifies each terminal to be managed and information indicating countermeasures applicable to each terminal to be managed. The terminal-specific countermeasure information is generated by checking on terminals to be managed in advance based on information (risk information) indicating security risks, their countermeasures and the like which is provided from each vendor, for example, and stored into a specified storage unit (not shown). In the example of FIG. 3, against the vulnerability A, "countermeasure (1)" and "countermeasure (3)" are applicable to the terminal A, "countermeasure (2)" is applicable to the terminal B, and "countermeasure (3)" is applicable to the terminal C. A storage unit to store the terminal-specific countermeasure information as shown in FIG. 3 may be included in the information processing device 10, or may be included in another device that is connected for communication with the information processing device 10.

The remaining terminal specifying unit 140 reads the terminal-specific countermeasure information from a specified storage unit (not shown) and, based on the read terminal-specific countermeasure information, specifies terminals to be managed in which the security risk remains (which are hereinafter referred to also as remaining terminals) if the countermeasure indicated by the selection input received by the countermeasure is taken. As described above, the terminal-specific countermeasure information is information indicating countermeasures applicable to each terminal to be managed against a security risk, and it is stored in a storage unit in the format as shown in FIG. 3. The remaining terminal specifying unit 140 can specify terminals to be managed to which the countermeasure indicated by the selection input is applicable based on the correspondence between terminal identification information and applicable countermeasures in the terminal-specific countermeasure information as shown in FIG. 3. At the same time, the remaining terminal specifying unit 140 can specify terminals to be managed in which the security risk remains (remaining terminals).

The operating information specifying unit 120 specifies the type of operating information corresponding to countermeasures applicable to terminals to be managed by using the above-described terminal-specific countermeasure information and definition information that defines the correspondence between the type of operating information of a terminal to be managed and a countermeasure against a security risk. The operating information is information containing at least one of information indicating a history of operations and processing actually performed in a terminal to be managed (operating history information) and information indicating operations and processing scheduled to be performed in a terminal to be managed (operating schedule information). Such operating information is generated in each terminal to be managed in response to input of execution of a specified operation or processing or input of an execution schedule of a specified operation or processing in each terminal to be managed, and stored into a storage unit of this terminal to be managed. Further, "type of operating information" means a category to which each operating information belongs. Specific examples of "type of operating history information" include "patch application history", "restart history", "continuous operating time", "port usage history", "process operating history", "application usage history" and the like. Further, specific examples of "type of operating schedule information" include "scheduled patch application date and time", "scheduled restart date and time", "scheduled application start date and time" and the like. Note that, however, the type of operating information is not limited to those examples.

The definition information is stored in a specified storage unit (not shown) in the format as shown in FIG. 4, for example. FIG. 4 is a view showing an example of the definition information. Note that FIG. 4 is an example of the definition information in the case where the security risk is the vulnerability A. In FIG. 4, a countermeasure against the vulnerability A ("countermeasure (1)", "countermeasure (2)", "countermeasure (3)") and the type of operating information of a terminal to be managed, which is used as a reference to determine whether or not to apply this countermeasure, are stored in association with each other. In the example of FIG. 4, "countermeasure (1)" is a countermeasure that applies a patch AAAA and restarts. "Countermeasure (2)" is a countermeasure that stops a process ZZZZ. "Countermeasure (3)" is a countermeasure that blocks a port 1027. Further, "type of operating information" corresponding to "countermeasure (1)" is "patch application history", "restart history" and "continuous operating time". "Type of operating information" corresponding to "countermeasure (2)" is "operating history of process ZZZZ". "Type of operating information" corresponding to "countermeasure (3)" is "usage history of port 1027". A storage unit to store the definition information as shown in FIG. 4 may be included in the information processing device 10, or may be included in another device that is connected for communication with the information processing device 10.

The operating information specifying unit 120 specifies an applicable countermeasure and the type of operating information corresponding to this countermeasure for each terminal to be managed based on the terminal-specific countermeasure information in FIG. 3 and the definition information in FIG. 4, for example. To be specific, based on the terminal-specific countermeasure information in FIG. 3, the operating information specifying unit 120 specifies that, against the vulnerability A, "countermeasure (1)" and "countermeasure (3)" are applicable to the terminal A. Then, based on the definition information in FIG. 4, the operating information specifying unit 120 specifies "type of operating information" corresponding to "countermeasure (1)" as "patch application history", "restart history" and "continuous operating time". Further, based on the definition information in FIG. 4, the operating information specifying unit 120 specifies "type of operating information" corresponding to "countermeasure (3)" as "usage history of port 1027". Regarding the terminal B also, just like in the case of the terminal A, the operating information specifying unit 120 specifies an applicable countermeasure (only "countermeasure (2)") and the type of operating information corresponding to it ("operating usage history of process ZZZZ").

The operating information acquisition unit 130 acquires the operating information of the type specified by the operating information specifying unit 120. The operating information acquisition unit 130 acquires the operating information of the type specified by the operating information specifying unit 120 from the operating information of a terminal to be managed by the following way, for example.

The operating information acquisition unit 130 notifies a terminal to be managed of the type of operating information specified by the operating information specifying unit 120, and receives the operating information of this type as a response from the terminal to be managed, for example. Alternatively, the operating information acquisition unit 130 may acquire the operating information stored in a terminal to be managed, and extract the operating information of the type specified by the operating information specifying unit 120 from the acquired information. The operating information acquisition unit 130 may acquire necessary operating information from all of the operating information stored in a terminal to be managed, or may acquire necessary operating information from the operating information within a specified period of time (e.g., for one month) stored in a terminal to be managed. An example of the operating information may contain information about an operating history within a past specified period of time (e.g., for one month in the past etc.), which is information about restart performed in the past, information about a port number accessed in the past, and information about a process carried out in the past. Another example of the operating information may contain information about an operating schedule for a future specified period of time (e.g., for one month in the future etc.), which is information about restart scheduled to be performed in the future, information about a port number scheduled to be accessed in the future, and information about a process scheduled to be carried out in the future. Further, the operating information may be a combination of them. When there is a subsystem that manages a terminal to be managed, a future operating schedule may be acquired from this subsystem.

To be specific, the operating information acquisition unit 130 acquires the operating information as shown in FIG. 5. FIG. 5 is a view showing an example of the operating information acquired by the operating information acquisition unit 130. Note that FIG. 5 is an example of the operating information in the case where the security risk is the vulnerability A. The operating information acquisition unit 130 acquires the operating information of "patch application history", "restart history" and "continuous operating time" from the terminal A for "countermeasure (1)", which is applicable to the terminal A, based on the type of the operating information specified by the operating information specifying unit 120. Further, the operating information acquisition unit 130 acquires the operating information of "usage history of port 1027" from the terminal A for "countermeasure (3)", which is applicable to the terminal A, based on the type of the operating information specified by the operating information specifying unit 120. Regarding the terminal B, just like in the case of the terminal A, the operating information acquisition unit 130 also acquires the operating information of "operating usage history of process ZZZZ" from the terminal B for "countermeasure (2)", which is applicable to the terminal B. When the operating information relates to the past operating history, the date of the operating information is in the past. When, on the other hand, the operating information relates to the future operating schedule, the date of the operating information is in the future.

The prediction unit 150 predicts the number of terminals to be managed in which the security risk remains (remaining terminals) at future times based on the operating information acquired by the operating information acquisition unit 130. For example, according to the operating information shown in FIG. 5, the prediction unit 150 can make the following predictions about the terminal A (it is assumed in this example that the prediction unit 150 checks the operating information of in FIG. 5 on Wednesday, May 27, 2015). The prediction unit 150 can determine the periodic restart timing by referring to "restart history" associated with "countermeasure (1)". In the case where the field of "restart schedule" is placed together with the field of "restart history" or instead of the field of "restart history", and information about a schedule of future restart is stored in the field of "restart schedule", the restart timing can be determined by referring to "restart schedule". For example, the prediction unit 150 may predict or determine the restart schedule with the closest scheduled date and time as the restart timing. Further, the prediction unit 150 can determine the periodic patch application timing by referring to "patch application history" associated with "countermeasure (1)". To be specific, in the terminal A, a patch was applied and the terminal A was restarted periodically in the morning every Thursday. Based on this information, the prediction unit 150 can predict the timing to apply "countermeasure (1)", which is, the timing to apply a patch AAAA and restart, as "in the morning next Thursday", i.e., "in the morning on Thursday, May 28, 2015". This is because, according to the past restart history, restart was performed at 10 o'clock every Thursday three times in the past, out of all three times occurred in the past, and it is predictable that the next restart will be performed also at 10 o'clock on Thursday based on this periodicity. In another method, the number of times of restart may be counted for each day of week, and it may be predicted that restart is more likely to be performed on a day of the week when the counted number is larger. Further, the prediction unit 150 can determine the usage history of the port 1027 by referring to "usage history of port 1027" associated with "countermeasure (3)". To be specific, regarding the terminal A, the port 1027 was used two days in succession, i.e., two days and one day before. In this manner, when information about a plurality of usage dates is stored in "usage history of port 1027", the prediction unit 150 may determine that the port 1027 is likely to be used again, and set the timing to apply "countermeasure (3)", which is the timing to block the port 1027, as the timing after a specified number of days, which is set rather long, have passed. Alternatively, regarding the terminal A, the prediction unit 150 may determine not to predict a date for "countermeasure (3)"; in other words, may determine not to apply "countermeasure (3)" to the terminal A. In the first embodiment, the prediction unit 150 predicts the timing to block the port 1027 at the timing after a specified number of days, which is set rather long, have passed, e.g., "Wednesday, Jun. 3, 2015", which is after one week, as in the former case. Note that the specified number of days may be a predetermined number of days. In this manner, by referring to the operating information corresponding to a countermeasure, the prediction unit 150 can easily predict the timing to take the countermeasure.

The prediction unit 150 predicts the timing to apply applicable countermeasures in the above way for terminals to be managed other than the remaining terminals specified by the remaining terminal specifying unit 140. To be specific, for each of terminals to be managed other than the remaining terminals, the prediction unit 150 specifies applicable countermeasures based on the terminal-specific countermeasure information in FIG. 3 and predicts the timing to apply the applicable countermeasures based on the operating information in FIG. 5. The prediction unit 150 assumes that, for each of terminals to be managed other than the remaining terminals, the applicable countermeasure is taken at the predicted application timing, and the vulnerability A is eliminated. For example, regarding the terminal A, the timing to apply "countermeasure (1)" is predicated as "in the morning on Thursday, May 28, 2015", and the timing to apply "countermeasure (3)" is predicated as "on Wednesday, Jun. 3, 2015" as described above. Thus, the prediction unit 150 assumes that, in the terminal A, the vulnerability A is eliminated "in the morning on Thursday, May 28, 2015", which is the earlier date. Based on such assumption, the prediction unit 150 counts the number of terminals to be managed (remaining terminals) in which the vulnerability A remains at each future time (e.g., immediately, next day, after one week, after one month etc.) in chronological order up to a future time at which the number of remaining terminals becomes equal to or less than a specified number (e.g., 0), and uses this counted value as a predicted value of the number of remaining risks (terminals to be managed in which the vulnerability A remains). FIG. 6 is a view showing an example of prediction results predicted by the prediction unit 150. Note that FIG. 6 shows an example of prediction results in the case where the security risk is the vulnerability A. The prediction results of FIG. 6 are results when the selection receiving unit 110 receives an input indicating selection of "countermeasure (1)", "countermeasure (2)" and "countermeasure (3)". The example of FIG. 6 is an example where the specified number is 0, and the prediction unit 150 predicts the number of remaining terminals in chronological order up to "after three months" when the number of remaining terminals becomes 0 or less. To be specific, in the example of FIG. 6, the number of remaining terminals is predicted to be 22 "after immediate execution", 13 on the "next day", 6 "after one week", 2 "after one month", and 0 "after three months".

The presentation unit 160 presents the prediction results predicted by the prediction unit 150 on a display device (not shown) or the like connected to the information processing device 10, for example. For example, as shown in FIG. 7, the presentation unit 160 reflects, on the screen of FIG. 2, the prediction results predicted by the prediction unit 150 ("remaining risk predicted value") and results of counting the number of remaining terminals specified by the remaining terminal specifying unit 140 ("remaining risks after countermeasure"). FIG. 7 is a view showing an example of a screen presented by the presentation unit 160. Note that FIG. 7 is an example of a screen in the case where the security risk is the vulnerability A. FIG. 7 illustrates a screen when all of "countermeasure (1)", "countermeasure (2)" and "countermeasure (3)" are selected on the screen of FIG. 2. On the screen of FIG. 7, "after one week" is selected in the drop-down list of "remaining risk predicted value". Thus, "remaining risk predicted value" "after one week" is displayed. Note that, however, when another future time is selected, "remaining risk predicted value" at the selected future time (e.g., "next day") is displays. In this way, when a countermeasure against the security risk is selected on a screen presented by the information processing device 10, results if this countermeasure is taken is shown on the screen.

Figure 8:
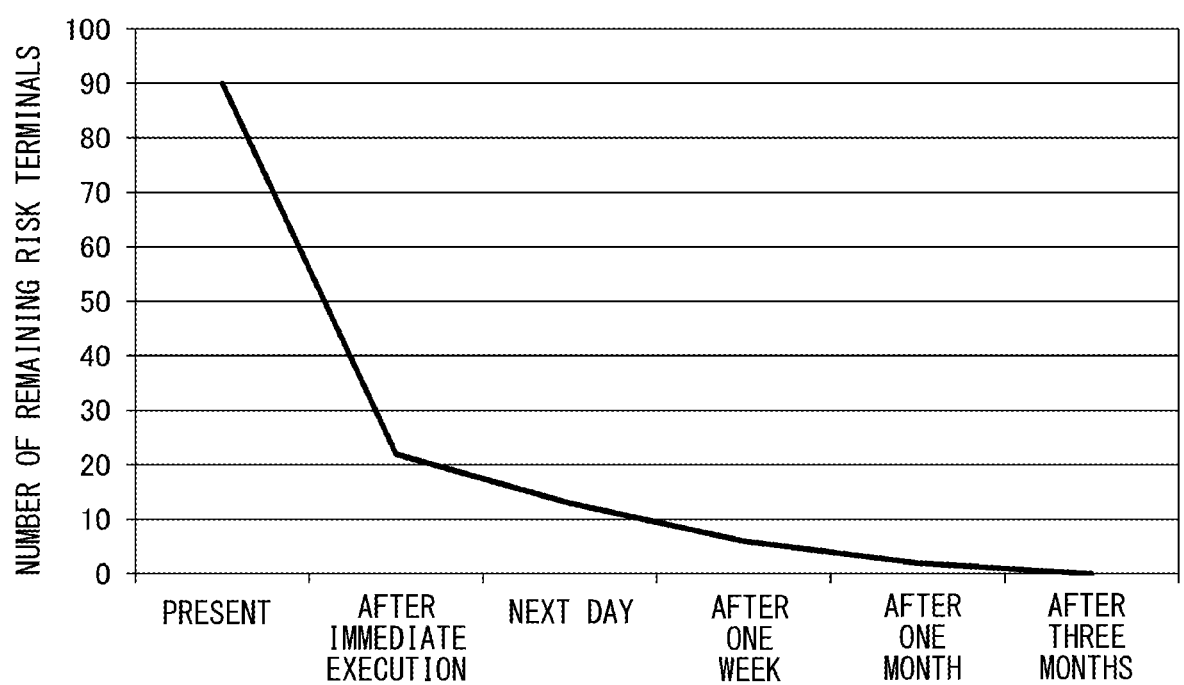
FIG. 8 is a view showing another example of a screen presented by the presentation unit according to the first embodiment.

Alternatively, the presentation unit 160 may display a screen showing a graph of "remaining risk predicted value" at each future time in chronological order as shown in FIG. 8, instead of the screen of FIG. 7. FIG. 8 is a view showing another example of a screen presented by the presentation unit 160. Note that FIG. 8 is an example of a screen in the case where the security risk is the vulnerability A. Further, although FIG. 8 displays the number of remaining risks (terminals to be managed in which the vulnerability A remains) at the present time also, whether or not to display the number of remaining risks at the present time is not particularly limited.

[Hardware Configuration]

Figure 9:
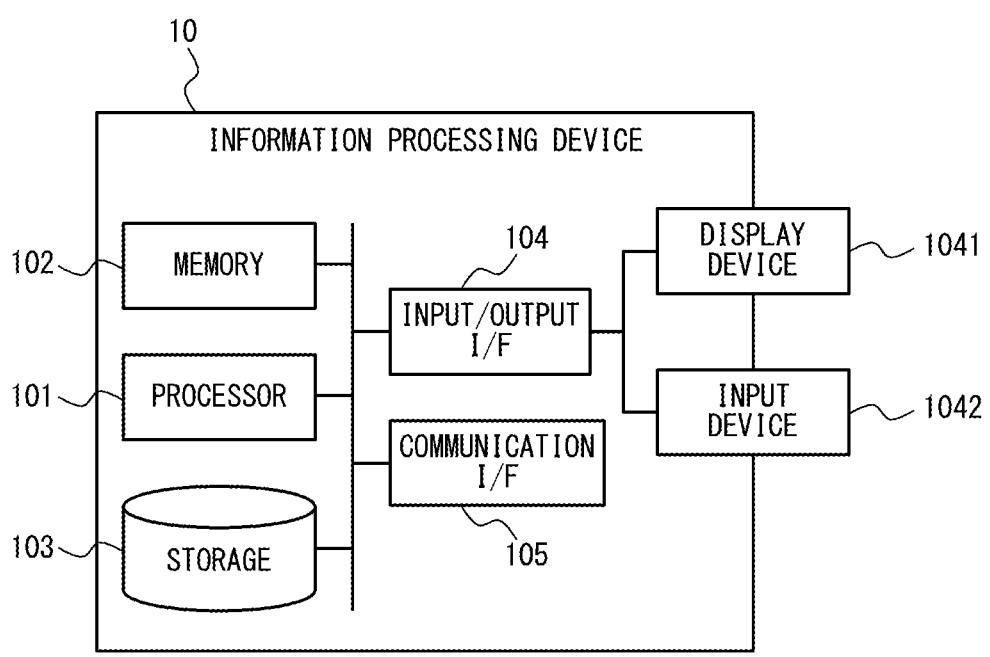
FIG. 9 is a view conceptually showing the hardware configuration of the information processing device according to the first embodiment.

FIG. 9 is a view conceptually showing the hardware configuration of the information processing device 10 according to the first embodiment. As shown in FIG. 9, the information processing device 10 according to the first embodiment includes a processor 101, a memory 102, a storage 103, an input/output interface (input/output I/F) 1004, a communication interface (communication I/F) 105 and the like, and it is implemented by a computer, for example. The processor 101, the memory 102, the storage 103, the input/output interface 104 and the communication interface 105 are connected through a data transmission line for transmitting and receiving data to and from one another.

The processor 101 is a processing unit such as CPU (Central Processing Unit) or GPU (Graphics Processing Unit). The memory 102 is a memory such as RAM (Random Access Memory) or ROM (Read Only Memory). The storage 103 is a storage device such as HDD (Hard Disk Drive), SSD (Solid State Drive) or memory card. Alternatively, the storage 103 may be a memory such as RAM or ROM.

The storage 103 stores a program for implementing the function of each processing unit (the selection receiving unit 110, the operating information specifying unit 120, the operating information acquisition unit 130, the remaining terminal specifying unit 140, the prediction unit 150, the presentation unit 160 etc.) included in the information processing device 10. The processor 101 executes each program and thereby implements the function of each processing unit. The processor 101 may execute each program after reading the program onto the memory 102, or may execute each program without reading it onto the memory 102.

The above-described program can be stored and provided to the computer using any type of non-transitory computer readable medium. The non-transitory computer readable medium includes any type of tangible storage medium. Examples of the non-transitory computer readable medium include magnetic storage media (such as floppy disks, magnetic tapes, hard disk drives, etc.), optical magnetic storage media (e.g. magneto-optical disks), CD-ROM (Compact Disc-Read Only Memory), CD-R (CD-Recordable), CD-R/W (CD-ReWritable), and semiconductor memories (such as mask ROM, PROM (Programmable ROM), EPROM (Erasable PROM), flash ROM, RAM (Random Access Memory), etc.). The program may be provided to a computer using any type of transitory computer readable medium. Examples of the transitory computer readable medium include electric signals, optical signals, and electromagnetic waves. The transitory computer readable medium can provide the program to a computer via a wired communication line such as an electric wire or optical fiber or a wireless communication line.

The input/output interface 104 is connected with a display device 1041, an input device 1042 and the like. The display device 1041 is a device that displays a screen corresponding to drawing data processed by the processor 101, such as LCD (Liquid Crystal Display) or CRT (Cathode Ray Tube) display. The input device 1042 is a device that receives an operation input by an operator, such as a keyboard, a mouse or a touch sensor, for example. The display device 1041 and the input device 1042 may be integrated and implemented as a touch panel.

The communication interface 105 transmits and receives data to and from an external device. For example, the communication interface 105 communicates with an external device through a wired or wireless network.

Note that the hardware configuration of the information processing device 10 is not limited to the configuration shown in FIG. 9.

Operation Example

Figure 10:
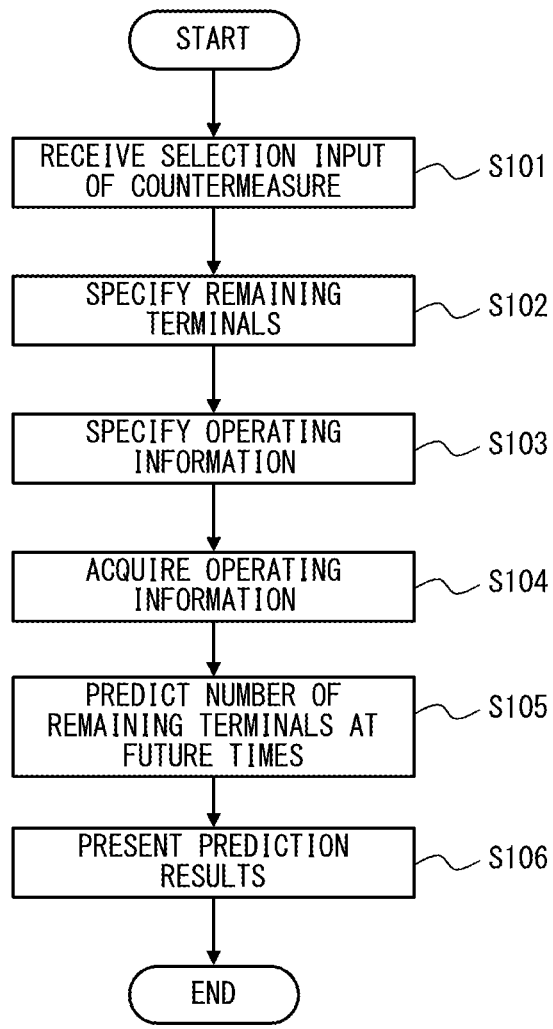
FIG. 10 is a flowchart showing the process flow of the information processing device according to the first embodiment.

An operation example of the information processing device 10 according to the first embodiment is described hereinafter with reference to FIG. 10. FIG. 10 is a flowchart showing the process flow of the information processing device 10 according to the first embodiment. An operation example in the case where the security risk is the vulnerability A is described hereinbelow.

First, the selection receiving unit 110 receives an input from a security administrator through the screen as shown in FIG. 2 (S101). The input from a security administrator is an input that selects at least one countermeasure among a plurality of countermeasures against the vulnerability A presented on the screen.

Next, the remaining terminal specifying unit 140 specifies the remaining terminals in which the vulnerability A remains by referring to a storage unit that stores the terminal-specific countermeasure information, using the countermeasure indicated by the input received by the selection receiving unit 110 as a key (S102). For example, it is assumed that the storage unit stores the terminal-specific countermeasure information in FIG. 3, and the selection receiving unit 110 receives an input indicating selection of "countermeasure (1)". In this case, the remaining terminal specifying unit 140 specifies at least "terminal B" and "terminal C" as terminals to which "countermeasure (1)" is not applicable (remaining terminals).

Then, the operating information specifying unit 120 specifies the type of operating information corresponding to each countermeasure applicable to the terminals to be managed (S103), and the operating information acquisition unit 130 acquires, from the terminals to be managed, the operating information of the type specified by the operating information specifying unit 120 (S104). For example, it is assumed that the storage unit stores the terminal-specific countermeasure information of FIG. 3 and the definition information of FIG. 4. In this case, the operating information specifying unit 120 specifies that, for the terminal A, "countermeasure (1)" and "countermeasure (3)" are applicable, and the types of operating information corresponding to "countermeasure (1)" are "patch application history", "restart history" and "continuous operating time", and the type of operating information corresponding to "countermeasure (3)" is "usage history of port 1027". Therefore, the operating information acquisition unit 130 acquires, for the terminal A, "patch application history", "restart history", "continuous operating time" and "usage history of port 1027" from the operating information of the terminal A.

Then, the prediction unit 150 predicts the number of remaining terminals at future times based on the operating information acquired by the operating information acquisition unit 130 (S105). For example, it is assumed that the storage unit stores the terminal-specific countermeasure information of FIG. 3 and the operating information of FIG. 5. In this case, for the terminals to be managed other than the remaining terminals specified by the remaining terminal specifying unit 140, the prediction unit 150 specifies applicable countermeasures based on the terminal-specific countermeasure information of FIG. 3, predicts the timing to apply the applicable countermeasures based on the operating information of FIG. 5, counts the number of remaining terminals for each future time, and thereby obtains the prediction results as shown in FIG. 6.

After that, the presentation unit 160 presents the prediction results predicted by the prediction unit 150 (S106). The presentation unit 160 may present a screen where the prediction results are reflected on the screen of FIG. 2 as shown in FIG. 7, or may present a screen showing a graph representing the prediction results in chronological order as shown in FIG. 8.

Functional Effects of First Embodiment

As described above, according to the first embodiment, the number of remaining terminals (remaining risks) at each future time if a selected countermeasure is taken is predicted, and prediction results are presented. Viewing this presentation, a security administrator can grasp how many remaining terminals remain at future times if a certain countermeasure among a plurality of countermeasures is taken. The security administrator can thereby determine whether or not to immediately apply the presented countermeasure and, when a plurality of countermeasures are presented, which is the most appropriate countermeasure. Thus, according to the first embodiment, a security administrator can easily develop countermeasures against a security risk.

Second Embodiment

The second embodiment is a more concrete version of the first embodiment.

[System Configuration]

Figure 11:
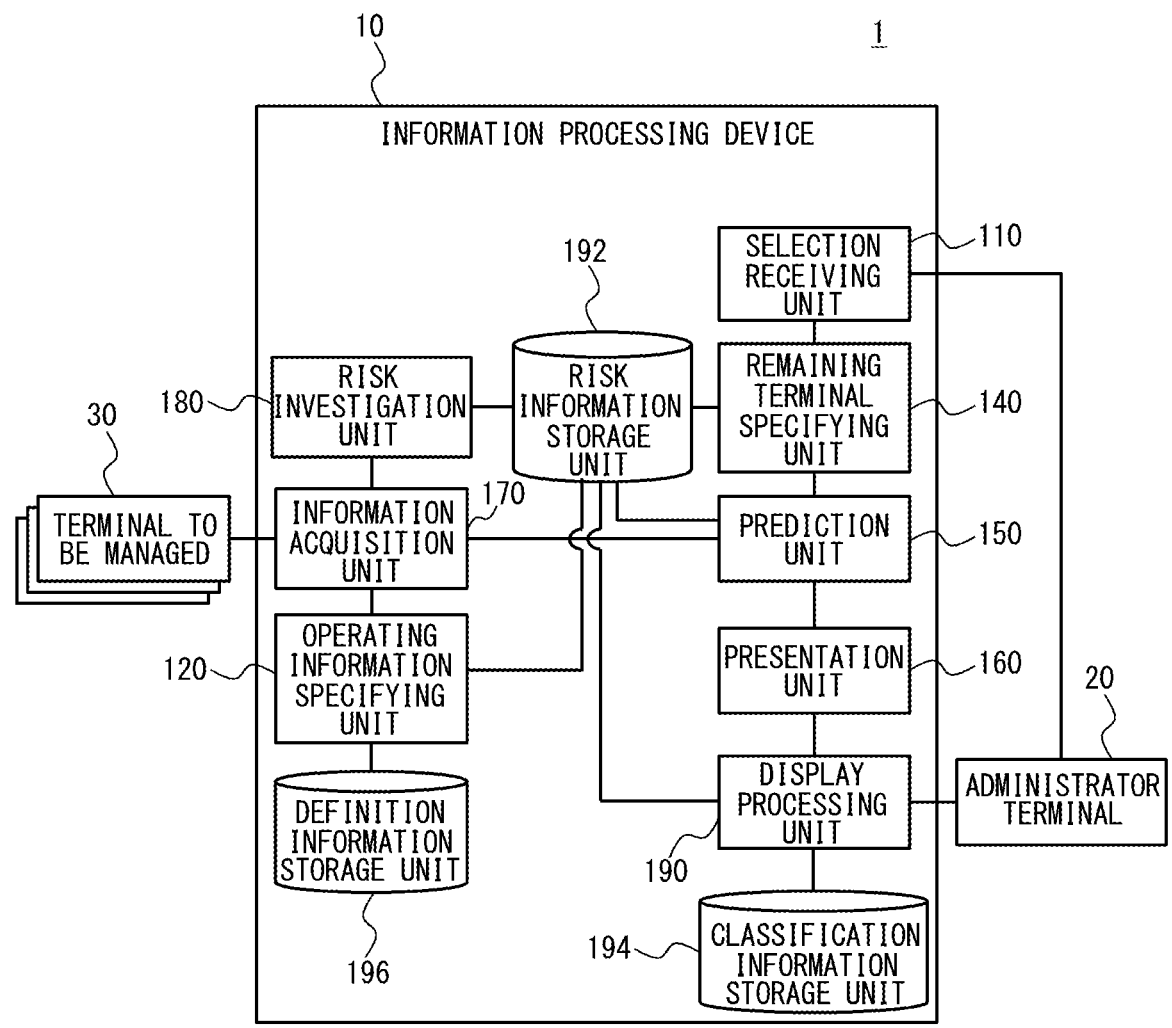
FIG. 11 is a view conceptually showing the system configuration of an information processing system according to a second embodiment.

FIG. 11 is a view conceptually showing the system configuration of an information processing system 1 according to a second embodiment. As shown in FIG. 11, the information processing system 1 according to the second embodiment includes an information processing device 10, an administrator terminal 20, and terminals 30 to be managed. The administrator terminal 20 is a terminal to be used by a security administrator, and it is a stationary PC (Personal Computer), a tablet terminal or the like. The terminals 30 to be managed are not only communication equipment such as a client terminal, a server, a switch or a router on a network but also everything with a function of connecting to a network or a means of communicating through a network (so-called IoT (Internet of Things)).

[Processing Configuration]

As shown in FIG. 11, the information processing device 10 according to the second embodiment includes an information acquisition unit 170 in place of the operating information acquisition unit 130 in the first embodiment, and further includes a risk investigation unit 180, a display processing unit 190, a risk information storage unit 192, a classification information storage unit 194, and a definition information storage unit 196. Note that the information acquisition unit 170 has the same function as the operating information acquisition unit 130 and further has other functions described below.

The information acquisition unit 170 acquires terminal information from each of the terminals 30 to be managed, and thereby obtains information as shown in FIG. 12. FIG. 12 is a view showing an example of terminal information acquired by the information acquisition unit 170. The terminal information contains the OS (Operating System) type and the OS version of the terminal 30 to be managed, various applications installed into the terminal 30 to be managed and the like, for example. Note that, however, the terminal information is not limited to the information as illustrated in FIG. 12. The information acquisition unit 170 also performs the operation of the operating information acquisition unit 130 according to the first embodiment, which is, the operation of acquiring the operating information of the type specified by the operating information specifying unit 120 from each of the terminals 30 to be managed.

The risk investigation unit 180 investigates the terminals 30 to be managed having security risks by checking the terminal information acquired by the information acquisition unit 170 against information about security risks provided from each vendor or the like, and generates risk information containing the terminal-specific countermeasure information as shown in FIG. 3. For example, in the case where the security risk is the vulnerability A, the risk information may further contain information such as the overview of the vulnerability A and the description of each countermeasure in addition to the terminal-specific countermeasure information as shown in FIG. 3. The risk investigation unit 180 stores the generated risk information into the risk information storage unit 192.

The display processing unit 190 generates a screen to be displayed on a display unit (not shown) of the administrator terminal 20 by using the risk information stored in the risk information storage unit 192, and outputs this screen to the administrator terminal 20. In the second embodiment, the display processing unit 190 generates a screen that classifies and displays the terminals having the vulnerability A as shown in FIG. 14, for example, by using classification information in the classification information storage unit 194 as shown in FIG. 13, for example. By using the classification information, it is possible to determine the tendency of the remaining terminals. FIG. 13 is a view showing an example of classification information stored by the classification information storage unit 194, and FIG. 14 is a view showing an example of a screen generated by the display processing unit 190. Note that FIG. 14 is an example of a screen in the case where the security risk is the vulnerability A. In the example of FIG. 13, the classification information storage unit 194 stores terminal identification information (e.g., MAC address etc.) that identifies each terminal to be managed and two kinds of classification information (terminal type and priority) in association with each other. To be specific, the terminals 30 to be managed are first classified into "server" or "client", and further, the terminals 30 to be managed that belong to "client" are classified by priority. The display processing unit 190 generates a screen that classifies ("server" or "client", and a priority level "high/intermediate/low" for "client") and displays the terminals 30 to be managed as shown in FIG. 14 by using the classification information shown in FIG. 13, and displays the screen on a display unit (not shown) of the administrator terminal 20.

A security administrator checks the screen (e.g., the screen of FIG. 14) displayed on the administrator terminal 20, and inputs selection of a countermeasure to be applied against the vulnerability A. A result of the input is transmitted to the selection receiving unit 110. The selection receiving unit 110 receives the selection input for each classified category through the screen as shown in FIG. 14, and the remaining terminal specifying unit 140 specifies, for each category, the remaining terminals if a countermeasure selected for each category is taken based on the selection input for each category. Further, the prediction unit 150 predicts, for each category, the number of remaining terminals at future times if a countermeasure selected for each category is taken. The prediction unit 150 makes predictions as shown in FIG. 15, for example. FIG. 15 is a view showing an example of prediction results predicated by the prediction unit 150. Note that FIG. 15 is an example of prediction results in the case where the security risk is the vulnerability A. The prediction results of FIG. 15 are prediction results in the case where the selection receiving unit 110 receives an input indicating that, for "server", "countermeasure (1)", "countermeasure (2)" and "countermeasure (3)" are selected and, for "client", "countermeasure (1)" and "countermeasure (2)" are selected in all of the priority levels "high", "intermediate" and "low". The example of FIG. 15 is an example where the specified number is 0, and the prediction unit 150 predicts the number of remaining terminals in chronological order up to "after three months" when the total number of remaining terminals becomes 0 or less. To be specific, in the example of FIG. 15, the total number of remaining terminals is predicted to be 22 "after immediate execution", 13 on the "next day", 6 "after one week", 2 "after one month", and 0 "after three months".

Then, the presentation unit 160 presents a screen that displays the number of remaining terminals for each category and the total number of remaining terminals ("remaining risks after countermeasure"), and a predicted value of the number of remaining terminals for each category at future times and a predicted value of the total number of remaining terminals ("remaining risk predicted value") as shown in FIG. 16, for example. FIG. 16 is a view showing an example of a screen presented by the presentation unit 160. Note that FIG. 16 is an example of a screen in the case where the security risk is the vulnerability A. The figure in parentheses in a field in a row of each countermeasure indicates the number of terminals 30 to be managed where the vulnerability A is eliminated if the countermeasure corresponding to this row is taken, and it varies according to selection of another countermeasure. For example, regarding "client" with the priority level "high", while the figure in parentheses in the field in the row of "countermeasure (2)" is "5" in the screen of FIG. 14, it is "2" in the screen of FIG. 16. This means that, if only "countermeasure (2)" is applied, the number of "clients" with the priority level "high" where the vulnerability A is eliminated is 5, and if "countermeasure (1)" and "countermeasure (2)" are applied in combination, the vulnerability A is eliminated by applying "countermeasure (1)" in three terminals out of those five terminals, and the vulnerability A is eliminated by applying "countermeasure (2)" in the remaining two terminals.

Figure 17:
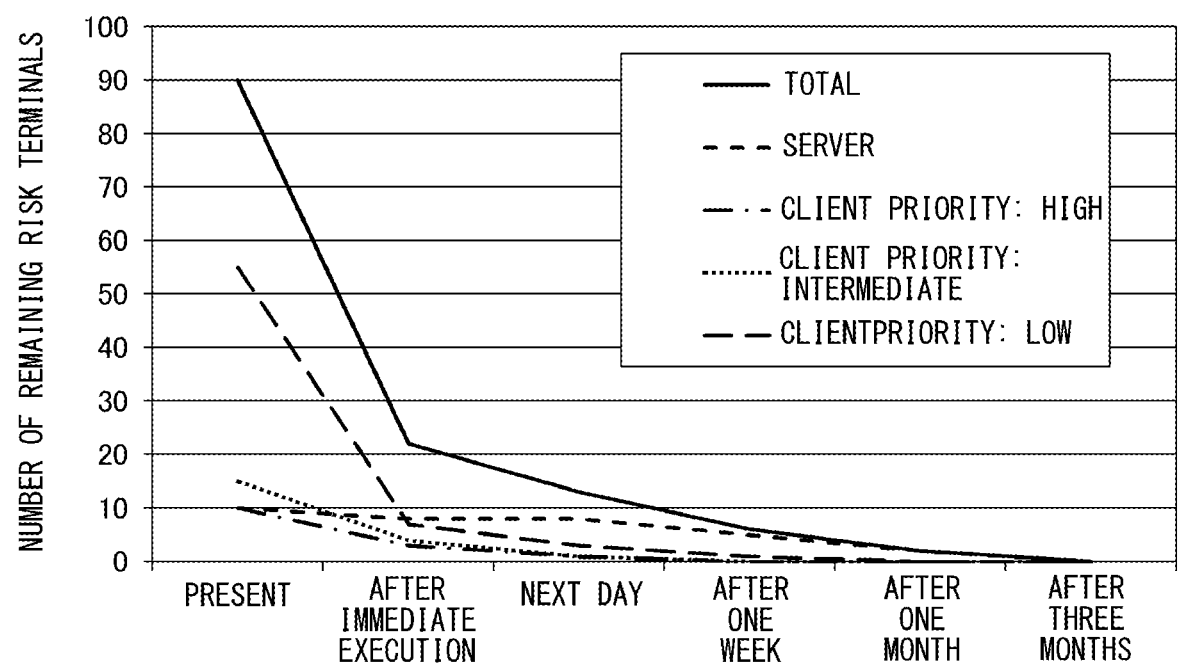
FIG. 17 is a view showing another example of a screen presented by the presentation unit according to the second embodiment.

Alternatively, the presentation unit 160 may display a screen showing a graph representing "remaining risk predicted value" for each category at each future time in chronological order as shown in FIG. 17, instead of the screen of FIG. 16. FIG. 17 is a view showing another example of a screen presented by the presentation unit 160. FIG. 17 is an example of a screen in the case where the security risk is the vulnerability A. Further, although FIG. 17 displays the number of remaining risks (terminals to be managed in which the vulnerability A remains) at the present time also, whether or not to display the number of remaining risks at the present time is not particularly limited.

Note that the screen of FIG. 16 or 17 presented by the presentation unit 160 is output to the administrator terminal 20 and displayed on a display unit (not shown) of the administrator terminal 20 by the display processing unit 190.

The definition information storage unit 196 stores definition information that defines the correspondence between the type of operating information of the terminal 30 to be managed and countermeasures against security risks (e.g., the definition information in FIG. 4). The definition information may be delivered from a server device (not shown) to the information processing device 10. The operating information specifying unit 120 specifies the type of operating information by using the definition information stored in the definition information storage unit 196.

[Hardware Configuration]

The information processing device 10 according to the second embodiment has the same hardware configuration as in the first embodiment. The storage 103 further stores a program for implementing the function of each processing unit (the information acquisition unit 170, the risk investigation unit 180 and the display processing unit 190) according to the second embodiment, and the processor 101 executes each program and thereby implements each processing unit according to the second embodiment. Further, the memory 102 and the storage 103 serve also as the risk information storage unit 192, the classification information storage unit 194 and the definition information storage unit 196.

Operation Example

Figure 18:
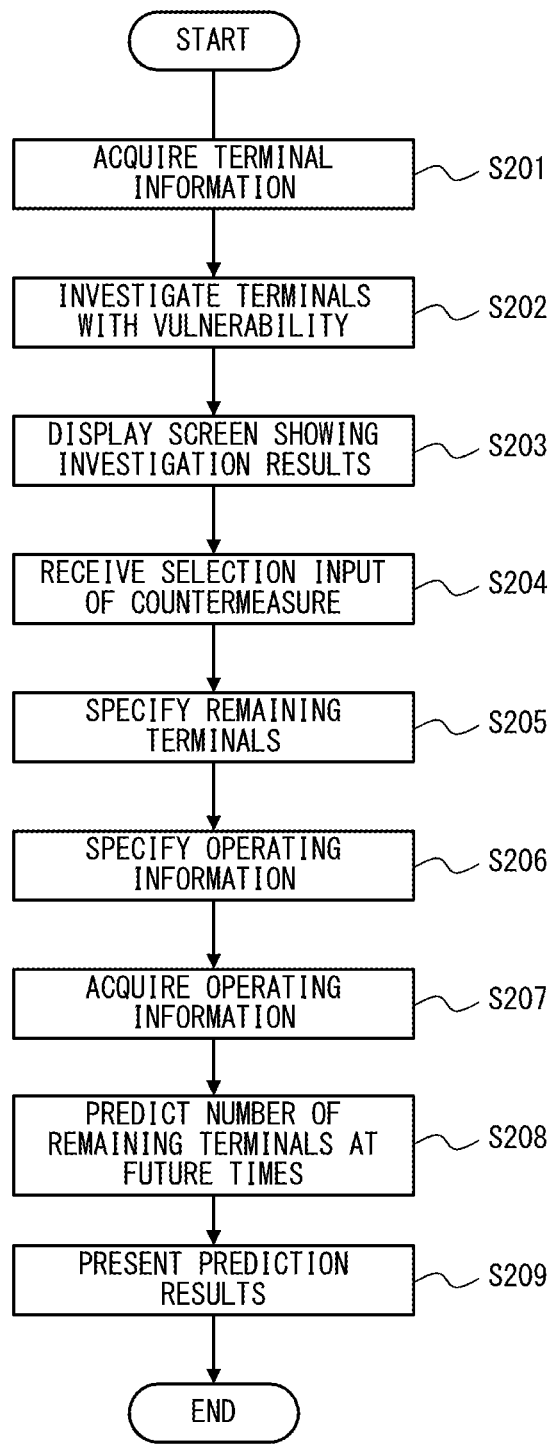
FIG. 18 is a flowchart showing the process flow of the information processing device according to the second embodiment.

An operation example of the information processing device 10 according to the second embodiment is described hereinafter with reference to FIG. 18. FIG. 18 is a flowchart showing the process flow of the information processing device 10 according to the second embodiment. An operation example in the case where the security risk is the vulnerability A is described hereinbelow.

The information acquisition unit 170 acquires terminal information of each terminal 30 to be managed in response to a screen display request from the administrator terminal 20, for example (S201). The risk investigation unit 180 then investigates the terminals 30 to be managed having the vulnerability A and generates risk information based on the acquired terminal information of each terminal 30 to be managed, for example (S202). The risk investigation unit 180 can specify the terminals 30 to be managed having the vulnerability A and applicable countermeasures and the like by checking the acquired terminal information of each terminal 30 to be managed against information about the vulnerability A provided from each vendor or the like, for example. Note that the processing of S201 and S202 may be performed prior to receiving a screen display request from the administrator terminal 20. In this case, the following processing of S203 is performed in response to a screen display request from the administrator terminal 20.

The display processing unit 190 generates a screen that displays results of investigating terminals with the vulnerability A (e.g., the screen of FIG. 14) based on the risk information generated in S202 and the classification information stored in the classification information storage unit 194, and displays this screen on a display unit (not shown) of the administrator terminal 20 (S203). A security administrator who uses the administrator terminal 20 views the content of the displayed screen, and performs an input operation to select at least one of a plurality of countermeasures. Then, the selection receiving unit 110 receives, from the administrator terminal 20, information indicating the countermeasure selected by the input operation on the administrator terminal 20 (S204). The remaining terminal specifying unit 140 specifies the remaining terminals for each category based on the information indicating the countermeasure selected on the administrator terminal 20 and the terminal-specific countermeasure information (S205). For example, it is assumed that the risk information storage unit 192 stores the terminal-specific countermeasure information of FIG. 3, and the selection receiving unit 110 receives an input indicating that "countermeasure (1)" and "countermeasure (2)" are selected for "server". In this case, the remaining terminal specifying unit 140 specifies at least "terminal C" as the terminals to which any of "countermeasure (1)" and "countermeasure (2)" cannot be applied (remaining terminals).

Next, the operating information specifying unit 120 specifies the type of operating information corresponding to the countermeasure applicable to the terminal 30 to be managed (S206), and the operating information acquisition unit 130 acquires the operating information of the type specified by the operating information specifying unit 120 from the terminal 30 to be managed (S207). For example, it is assumed that the risk information storage unit 192 stores the terminal-specific countermeasure information of FIG. 3, and the definition information storage unit 196 stores the definition information of FIG. 4. In this case, the operating information specifying unit 120 specifies that, for the terminal A, "countermeasure (1)" and "countermeasure (3)" are applicable, and the types of operating information corresponding to "countermeasure (1)" are "patch application history", "restart history" and "continuous operating time", and the type of operating information corresponding to "countermeasure (3)" is "usage history of port 1027". Therefore, the operating information acquisition unit 130 acquires, for the terminal A, "patch application history", "restart history", "continuous operating time" and "usage history of port 1027" from the operating information of the terminal A.

Then, the prediction unit 150 predicts the number of remaining terminals at future times for each category based on the operating information acquired by the operating information acquisition unit 130 (S208). For example, it is assumed that the risk information storage unit 192 stores the terminal-specific countermeasure information in FIG. 3, and the information acquisition unit 170 acquires the operating information in FIG. 5. In this case, for the terminals 30 to be managed other than the remaining terminals specified by the remaining terminal specifying unit 140, the prediction unit 150 specifies applicable countermeasures based on the terminal-specific countermeasure information in FIG. 3, predicts the timing to apply each applicable countermeasure based on the operating information in FIG. 5, and counts the number of remaining terminals for each future time. This processing is performed for each category, thereby obtaining the prediction results as shown in FIG. 15.

After that, the presentation unit 160 presents the prediction results predicted by the prediction unit 150 (S209). The presentation unit 160 may present a screen where the prediction results are reflected on the screen of FIG. 14 as shown in FIG. 16, or may present a screen showing a graph representing the prediction results in chronological order as shown in FIG. 17.

According to the second embodiment, the same effects as the first embodiment are obtained.

While the invention has been particularly shown and described with reference to embodiments thereof, the invention is not limited to these embodiments. It will be understood by those of ordinary skill in the art that various changes in form and details may be made therein without departing from the spirit and scope of the present invention as defined by the claims.

For example, in each of the embodiments described above, a button that causes each terminal to be managed to carry out a countermeasure based on selection on a screen may be further placed on the screen. When this button is pressed, the information processing device 10 generates an instruction that causes each terminal to carry out the countermeasure in accordance with the selection, and outputs this instruction to each terminal.

Further, an aspect of presenting the number of remaining terminals at future times is described in each of the embodiments described above. Note that, however, an index related to the remaining terminals may be presented. An example of the index related to the remaining terminals is the proportion of the number of remaining terminals to the number of terminals with a security risk, a color corresponding to this proportion or the like, for example.

Further, an aspect of presenting the number of remaining terminals at future times in response to a selection input for a countermeasure against a security risk is described in each of the embodiments described above. Note that, however, in the case where the number of applicable countermeasures is small, for example, the number of remaining terminals when all countermeasures are applied regardless of a selection input may be presented from the beginning.

Further, an aspect of reading the terminal-specific countermeasure information generated by investigating terminals to be managed in advance and presenting the number of remaining terminals at future times based on the read terminal-specific countermeasure information is described in each of the embodiments described above. Note that, however, the terminal-specific countermeasure information may be acquired by investigating terminals to be managed before presenting the number of remaining terminals at future times.

Further, in the second embodiment described above, terminals to be managed are first classified into categories of servers or clients, and then the clients are further classified by priority level. Note that, however, the method of classification is not limited thereto, and only classification into servers or clients may be carried out, or classification by priority level may be carried out regardless of servers or clients. Further, classification may be carried out by another method.

Further, although a plurality of steps (processing steps) are sequentially described in the plurality of flowcharts used in the description above, the order of performing the steps to be performed in the above-described embodiments is not limited to the sequence described above. In the above-described embodiments, the sequence of steps shown in the figures may be changed as appropriate. Further, the above-described embodiments may be combined as long as they are not conflicting.

Further, the whole or part of the embodiments disclosed above can be described as, but not limited to, the following supplementary notes.

Supplementary Note 1

An information processing device comprising:

a selection receiving unit configured to receive an input indicating selection of at least one countermeasure among a plurality of countermeasures applicable to a terminal with a security risk;

an operating information specifying unit configured to specify a type of operating information corresponding to a countermeasure applicable to the terminal by using terminal-specific countermeasure information indicating a countermeasure applicable to each terminal against the security risk and definition information defining correspondence between a type of operating information of the terminal and a countermeasure against the security risk;

an operating information acquisition unit configured to acquire operating information of the type specified by the operating information specifying unit among the operating information of the terminal;

a remaining terminal specifying unit configured to specify remaining terminals where the security risk remains when the countermeasure received by the selection receiving unit is applied based on the terminal-specific countermeasure information;

a prediction unit configured to predict the number of the remaining terminals at a future time based on the operating information acquired by the operating information acquisition unit; and a presentation unit configured to present prediction results predicted by the prediction unit.

Supplementary Note 2

The information processing device according to Supplementary Note 1, wherein the prediction unit predicts the number of the remaining terminals at future times in chronological order, and the presentation unit presents a graph showing the number of the remaining terminals at future times in chronological order.

Supplementary Note 3

The information processing device according to Supplementary Note 2, wherein the prediction unit predicts the number of the remaining terminals in chronological order up to a future time when the number of the remaining terminals becomes equal to or less than a specified number.

Supplementary Note 4

The information processing device according to any one of Supplementary Notes 1 to 3, further comprising:

a classification information storage unit configured to store classification information that classifies the terminals into categories, wherein the prediction unit predicts the number of the remaining terminals at a future time for each category of the terminals.

Supplementary Note 5

An information processing method performed by an information processing device, the method comprising:

a step of receiving an input indicating selection of at least one countermeasure among a plurality of countermeasures applicable to a terminal with a security risk;

a step of specifying a type of operating information corresponding to a countermeasure applicable to the terminal by using terminal-specific countermeasure information indicating a countermeasure applicable to each terminal against the security risk and definition information defining correspondence between a type of operating information of the terminal and a countermeasure against the security risk;

a step of acquiring operating information of the specified type among the operating information of the terminal;

a step of specifying remaining terminals where the security risk remains when the received countermeasure is applied based on the terminal-specific countermeasure information;

a step of predicting the number of the remaining terminals at a future time based on the acquired operating information; and a step of presenting the predicted results.

Supplementary Note 6

The information processing method according to Supplementary Note 5, wherein the prediction step predicts the number of the remaining terminals at future times in chronological order, and the presentation step presents a graph showing the number of the remaining terminals at future times in chronological order.

Supplementary Note 7

The information processing method according to Supplementary Note 6, wherein the prediction step predicts the number of the remaining terminals in chronological order up to a future time when the number of the remaining terminals becomes equal to or less than a specified number.

Supplementary Note 8

The information processing method according to any one of Supplementary Notes 5 to 7, further comprising:

a step of storing classification information that classifies the terminals into categories, wherein the prediction step predicts the number of the remaining terminals at a future time for each category of the terminals.

Supplementary Note 9

A non-transitory computer readable medium storing a program causing a computer to execute:

a step of receiving an input indicating selection of at least one countermeasure among a plurality of countermeasures applicable to a terminal with a security risk;

a step of specifying a type of operating information corresponding to a countermeasure applicable to the terminal by using terminal-specific countermeasure information indicating a countermeasure applicable to each terminal against the security risk and definition information defining correspondence between a type of operating information of the terminal and a countermeasure against the security risk;

a step of acquiring operating information of the specified type among the operating information of the terminal;

a step of specifying remaining terminals where the security risk remains when the received countermeasure is applied based on the terminal-specific countermeasure information;

a step of predicting the number of the remaining terminals at a future time based on the acquired operating information; and a step of presenting the predicted results.

Supplementary Note 10

The non-transitory computer readable medium according to Supplementary Note 9, wherein the prediction step predicts the number of the remaining terminals at future times in chronological order, and the presentation step presents a graph showing the number of the remaining terminals at future times in chronological order.

Supplementary Note 11

The non-transitory computer readable medium according to Supplementary Note 10, wherein the prediction step predicts the number of the remaining terminals in chronological order up to a future time when the number of the remaining terminals becomes equal to or less than a specified number.

Supplementary Note 12

The non-transitory computer readable medium according to any one of Supplementary Notes 9 to 11, wherein the program causes the computer to further execute:

a step of storing classification information that classifies the terminals into categories, wherein the prediction step predicts the number of the remaining terminals at a future time for each category of the terminals.

This application is based upon and claims the benefit of priority from Japanese patent application No. 2016-067734 filed on Mar. 30, 2016, the disclosure of which is incorporated herein in its entirety by reference.

REFERENCE SIGNS LIST

1 INFORMATION PROCESSING SYSTEM
  10 INFORMATION PROCESSING DEVICE
    101 PROCESSOR
    102 MEMORY
    103 STORAGE
    104 INPUT/OUTPUT INTERFACE
    1041 DISPLAY DEVICE
    1042 INPUT DEVICE
    105 COMMUNICATION INTERFACE
    110 SELECTION RECEIVING UNIT
    120 OPERATING INFORMATION SPECIFYING UNIT
    130 OPERATING INFORMATION ACQUISITION UNIT
    140 REMAINING TERMINAL SPECIFYING UNIT
    150 PREDICTION UNIT
    160 PRESENTATION UNIT
    170 INFORMATION ACQUISITION UNIT
    180 RISK INVESTIGATION UNIT
    190 DISPLAY PROCESSING UNIT
    192 RISK INFORMATION STORAGE UNIT
    194 CLASSIFICATION INFORMATION STORAGE UNIT
    196 DEFINITION INFORMATION STORAGE UNIT
  20 ADMINISTRATOR TERMINAL
  30 TERMINAL TO BE MANAGED

The invention claimed is:

1. An information processing device comprising:
a memory storing one or more instructions; and
a processor configured to execute the one or more instructions to:
receive an input indicating selection of at least one countermeasure among a plurality of countermeasures applicable to a terminal with a security risk;
specify a type of operating information corresponding to a countermeasure applicable to the terminal by using terminal-specific countermeasure information indicating a countermeasure applicable to each terminal against the security risk and definition information defining correspondence between a type of operating information of the terminal and a countermeasure against the security risk;
acquire operating information of the type that is specified, among the operating information of the terminal;
specify remaining terminals where the security risk remains when the countermeasure that is received is applied based on the terminal-specific countermeasure information;
predict the number of the remaining terminals at a future time based on the operating information that is acquired; and
present prediction results that are predicted,
wherein the operating information contains at least one of operating history information indicating a history of operations and processing actually performed in the terminal and operating schedule information indicating operations and processing scheduled to be performed in the terminal.

2. The information processing device according to claim 1, wherein
the processor is further configured to:
predict the number of the remaining terminals at future times in chronological order, and
present a graph showing the number of the remaining terminals at future times in chronological order.

3. The information processing device according to claim 2, wherein the processor is further configured to predict the number of the remaining terminals in chronological order up to a future time when the number of the remaining terminals becomes equal to or less than a specified number.

4. The information processing device according to claim 1, the processor is further configured to:
store classification information that classifies the terminals into categories, and
predict the number of the remaining terminals at a future time for each category of the terminals.

5. An information processing method performed by an information processing device, the method comprising:
a step of receiving an input indicating selection of at least one countermeasure among a plurality of countermeasures applicable to a terminal with a security risk;
a step of specifying a type of operating information corresponding to a countermeasure applicable to the terminal by using terminal-specific countermeasure information indicating a countermeasure applicable to each terminal against the security risk and definition information defining correspondence between a type of operating information of the terminal and a countermeasure against the security risk;
a step of acquiring operating information of the specified type among the operating information of the terminal;
a step of specifying remaining terminals where the security risk remains when the received countermeasure is applied based on the terminal-specific countermeasure information;
a step of predicting the number of the remaining terminals at a future time based on the acquired operating information; and
a step of presenting the predicted results,
wherein the operating information contains at least one of operating history information indicating a history of operations and processing actually performed in the terminal and operating schedule information indicating operations and processing scheduled to be performed in the terminal.

6. The information processing method according to claim 5, wherein
the prediction step predicts the number of the remaining terminals at future times in chronological order, and
the presentation step presents a graph showing the number of the remaining terminals at future times in chronological order.

7. The information processing method according to claim 6, wherein the prediction step predicts the number of the remaining terminals in chronological order up to a future time when the number of the remaining terminals becomes equal to or less than a specified number.

8. The information processing method according to claim 5, further comprising:
a step of storing classification information that classifies the terminals into categories, wherein
the prediction step predicts the number of the remaining terminals at a future time for each category of the terminals.

9. A non-transitory computer readable medium storing a program causing a computer to execute:
a step of receiving an input indicating selection of at least one countermeasure among a plurality of countermeasures applicable to a terminal with a security risk;
a step of specifying a type of operating information corresponding to a countermeasure applicable to the terminal by using terminal-specific countermeasure information indicating a countermeasure applicable to each terminal against the security risk and definition information defining correspondence between a type of operating information of the terminal and a countermeasure against the security risk;
a step of acquiring operating information of the specified type among the operating information of the terminal;
a step of specifying remaining terminals where the security risk remains when the received countermeasure is applied based on the terminal-specific countermeasure information;
a step of predicting the number of the remaining terminals at a future time based on the acquired operating information; and
a step of presenting the predicted results,
wherein the operating information contains at least one of operating history information indicating a history of operations and processing actually performed in the terminal and operating schedule information indicating operations and processing scheduled to be performed in the terminal.

10. The non-transitory computer readable medium according to claim 9, wherein
the prediction step predicts the number of the remaining terminals at future times in chronological order, and
the presentation step presents a graph showing the number of the remaining terminals at future times in chronological order.

11. The non-transitory computer readable medium according to claim 10, wherein the prediction step predicts the number of the remaining terminals in chronological order up to a future time when the number of the remaining terminals becomes equal to or less than a specified number.

12. The non-transitory computer readable medium according to claim 9, wherein the program causes the computer to further execute:
a step of storing classification information that classifies the terminals into categories, wherein
the prediction step predicts the number of the remaining terminals at a future time for each category of the terminals.

* * * * *